United States Patent [19]
Hasegawa et al.

[11] Patent Number: 6,166,887
[45] Date of Patent: Dec. 26, 2000

[54] MAGNETIC HEAD UNIT, WITH COIL WINDING ARRANGEMENT TO ALLOW FOR SPECIFIC GIMBAL TO HEAD SURFACE DIMENSIONS

[75] Inventors: Kiyoshi Hasegawa; Masayoshi Fujita, both of Miyagi, Japan

[73] Assignee: Sony Corporation, Tokyo, Japan

[21] Appl. No.: 09/293,723

[22] Filed: Apr. 19, 1999

[30] Foreign Application Priority Data

Apr. 27, 1998 [JP] Japan .................................. 10-117503

[51] Int. Cl.⁷ ...................................................... G11B 5/48
[52] U.S. Cl. ..................... 360/246.4; 360/234.9
[58] Field of Search ................................. 360/234.7, 235, 360/245–245.1, 246.4

[56] References Cited

U.S. PATENT DOCUMENTS 4,796,129   1/1989   Umebayshi .............................. 360/104
4,882,644  11/1989   Kimura .................................... 360/104

*Primary Examiner*—A. J. Heinz
*Attorney, Agent, or Firm*—Ronald P. Kananen; Rader, Fishman & Grauer

[57] ABSTRACT

A magnetic head unit is provided in which the distance between a surface of the gimbal plate put touching the pressing member and a surface of the magnetic head facing the first or second disc-shaped recording medium is set to fall in a range of 0.3 to 0.8 mm and thus the coil winding concavity can be formed in the intermediate portion of the magnetic head in the direction of the head thickness and the magnetic heads can be kept stably in place in relation to the disc-shaped recording medium. Also, a recording and/or reproducing apparatus using the magnetic head unit is provided.

2 Claims, 15 Drawing Sheets

MAGNETIC HEAD UNIT, WITH COIL WINDING ARRANGEMENT TO ALLOW FOR SPECIFIC GIMBAL TO HEAD SURFACE DIMENSIONS

BACKGROUND OF THE INVENTION

1. Field of the Invention

The present invention relates to a magnetic head unit to write and/or read signal to and/or from a disc-shaped recording medium, and a recording and/or reproducing apparatus comprising the magnetic head unit.

2. Description of Related Art

The recording and/or reproducing apparatuses for recording and/or reproducing signal to and/or from a signal recording surface of a disc-shaped recording medium such as a flexible disc, are widely used in personal computers as well as in office computers, word processors. The recording and/or reproducing apparatuses have been showing a remarkable prevalence.

The recording and/or reproducing apparatus comprises a magnetic head unit which writes and/or reads signal to and/or from a disc-shaped recording medium set in the apparatus.

The magnetic head unit comprises a pair of support arms and a pair of magnetic heads each including a magnetic head element and attached to each of the support arms to oppose each other. A disc-shaped recording medium is placed between the pair of magnetic heads to write and/or read signal with respect to a signal recording surface of the disc-shaped recording medium via the magnetic head elements.

Referring now to FIG. 1, there is illustrated a conventional magnetic head unit. This magnetic head unit is generally indicated with a reference 100. As shown in the form of a partial section view in FIG. 1, the magnetic head unit 100 comprises a pair of support arms 101 supported at base portions thereof, a pair of gimbal plates 102 each mounted at free end of each of the support arms 101, and a pair of magnetic heads 103 opposite to each other and each disposed on each of the gimbal plates 102. There is provided a pair of pivots 104 each formed integrally with each of the pair of support arms 101. The magnetic head unit 100 is adapted such that each of the pair of magnetic head 103 is moved by toward a disc-shaped recording medium 105 by each of the pivots 104 via the gimbal plate 102, whereby the magnetic heads 103 are moved to follow up with a displacement or deflection of the disc-shaped recording medium 105 to assure a stable write and read.

The disc-shaped recording medium 105 the recording and/or reproducing apparatus constructed as in the above writes and/or reads, is usually encased in a cartridge 106 for the purpose of protecting the signal recording surface thereof when it is set in the recording and/or reproducing apparatus.

The cartridge 106 has formed therein an opening 107 through which the magnetic head is introduced. When the magnetic head unit 100 is used to write and/or read the disc-shaped recording medium 105, the magnetic heads 103 of the magnetic head unit 100 is introduced into the cartridge 106 through the opening 107, and the magnetic head elements of the magnetic head 103 write and/or read signal to and/or from the disc-shaped recording medium 105 while sliding over the signal recording surface of the disc-shaped recording medium 105 inside the cartridge 106.

Therefore, in the magnetic head unit 100, the thickness t1 of the magnetic heads 103 is larger than the distance t2 from the surface of the cartridge 106 to the disc-shaped recording medium 105 so that when the magnetic heads 103 go into the cartridge 106, the support arms 101 will not touch the cartridge 106.

Recently, a flexible disc has been proposed which has a larger recording capacity than the flexible discs currently used in practice. This large capacity flexible disc has same outside dimensions as the conventional flexible discs. However, it has a storage capacity of tens to hundreds MB while the conventional flexible discs have a storage capacity of 1 to 2 MB.

In these situations, it has been proposed from the standpoint of a versatility to use a recording and/or reproducing apparatus destined to write and/or read such large capacity flexible discs as well as the conventional flexible discs. Namely, the lower capacity flexible discs are also usable with the proposed recording and/or reproducing apparatus.

As shown in FIG. 2, such a recording and/or reproducing apparatus has a magnetic head unit using a pair of magnetic heads 103 each comprising a magnetic head element 111 for the large capacity flexible discs (will be referred to as "high density medium-oriented magnetic head element" hereinafter for the convenience of the explanation) and a magnetic head element 112 for the conventional flexible discs (will be referred to as "low density medium-oriented magnetic head element" hereinunder for the same reason). Also, each of the magnetic heads 103 has formed in an intermediate portion thereof in the direction of the head thickness a concavity 113 open to the lateral side of the magnetic head 103 and in which a coil is wound on the high density medium-oriented magnetic head element 111.

In this recording and/or reproducing apparatus, a large capacity flexible disc is set in place in the apparatus is spun at a speed of about 3,600 rpm, for example, and the high-capacity magnetic head element 111 is used to write or read signal to or from the flexible disc. On the other hand, when a conventional flexible disc set in place in the apparatus is spun at a speed of 300 rpm, for example, the signal is written to and read from, the flexible disc by the low density medium-oriented magnetic head element 112.

In the mean time, the aforementioned magnetic head unit 100 is so constructed to allow the magnetic head 103 to follow up with the moving disc-shaped recording medium 105 for a stable write and read, the magnetic heads 103 are forced towards the disc-shaped recording medium 105 by the pivots 104 formed integrally with the pair of support arms 101 via the gimbal plates 102.

In this magnetic head unit 100, however, since the thickness t1 of the magnetic head 103 is set larger than the distance t2 between the surface of the cartridge 106 and disc-shaped recording medium 105 as mentioned above, the point at which the pivot 104 forces the magnetic head 103 via the gimbal plate 102 is off the surface of the magnetic head 103 sliding on the disc-shaped recording medium 105.

Thus, along with the spinning of the disc-shaped recording medium 105 and seeking operation of the magnetic head unit 100, the magnetic head 103 is applied with a force under which the magnetic head 103 is inclined, so that the posture of the magnetic head 103 in relation to the disc-shaped recording medium 105 cannot be kept stably.

Especially when a large capacity flexible disc is used with the recording and/or reproducing apparatus, since the flexible disc is spun at a speed of about 3,600 rpm, so a large force is applied to the magnetic head 103 as the flexible disc is spun, and thus it is difficult to keep the magnetic head 103 stably in position in relation to the flexible disc.

Therefore, in order to stabilize the posture of the magnetic head 103, the magnetic head 103 should desirably be designed to have a reduced thickness so that the point at which the pivot 104 forces the magnetic head 103 towards the disc-shaped recording medium 105 by means of the gimbal plate 102 is nearer to the surface of the magnetic head 103 sliding on the disc-like recording medium 105.

In the magnetic head unit 100 of a recording and/or reproducing apparatus adapted to make write or read with respect to a large capacity flexible disc, however, if the magnetic head 103 has an excessively small thickness, the above-mentioned coil winding concavity 113 cannot be formed in an intermediate portion of the magnetic head 103 in the direction of the head thickness.

SUMMARY OF THE INVENTION

Accordingly, the present invention has an object to overcome the above-mentioned drawbacks of the prior art by providing a magnetic head unit adapted to have a sufficient thickness to form the coil winding concavity in an intermediate portion thereof in the direction of the head thickness and stabilize the posture of the magnetic head in relation to a disc-shaped recording medium, and a recording and/or reproducing apparatus employing the magnetic head unit.

The above object can be achieved by providing a magnetic head unit comprising according to the present invention:

a pair of magnetic heads each having a first magnetic head element to write and/or read signal to and/or from a first disc-shaped recording medium and a second magnetic head element to write and/or write signal to and/or from a second disc-shaped recording medium having a higher recording density than the first disc-shaped recording medium, the magnetic head having formed in an intermediate portion thereof in the direction of the head thickness a concavity open at a lateral side of the magnetic head and in which a coil is wound on the second magnetic head element;

a pair of gimbal plates each supporting the magnetic head to be movable; and a pair of pressing members each abutting the gimbal plate to move the magnetic head towards the first or second disc-shaped recording medium.

The magnetic head unit is characterized in that the distance between a surface of the gimbal plate touching the pressing member and a surface of the magnetic head facing the first or second disc-shaped recording medium is set to fall in a range of 0.3 to 0.8 mm.

In the magnetic head unit, since the distance between a surface of the gimbal plate touching the pressing member and a surface of the magnetic head facing the first or second disc-shaped recording medium is 0.8 mm or less, the magnetic heads are kept stably in place in relation to the first or second disc-shaped recording medium.

Further, in the magnetic head unit, since the distance between a surface of the gimbal plate touching the pressing member and a surface of the magnetic head facing the first or second disc-shaped recording medium is 0.3 mm or more, the concavity in which the coil is wound on the second magnetic head element (will be referred to as "coil winding concavity" hereinunder) can be formed in the intermediate portion of the magnetic head in the direction of the head thickness.

The above object can be achieved also by providing a recording and/or reproducing apparatus comprising according to the present invention:

means for driving to spin a disc-shaped recording medium;

a magnetic head unit to write and/or read signal with respect to the disc-shaped recording medium drive to spin by the driving means; and a signal processor to supply the magnetic head unit with a signal corresponding to a recording signal and generate a read signal based on the signal supplied from the magnetic head unit.

The recording and/or reproducing apparatus is characterized in that the magnetic head unit comprises:

a pair of magnetic heads each having a first magnetic head element to write and/or read signal to and/or from a first disc-shaped recording medium and a second magnetic head element to write and/or write signal to and/or from a second disc-shaped recording medium having a higher recording density than the first disc-shaped recording medium, the magnetic head having formed in an intermediate portion thereof in the direction of the head thickness a concavity open at a lateral side of the magnetic head and in which a coil is wound on the second magnetic head element;

a pair of gimbal plates each supporting the magnetic head to be movable; and a pair of pressing members each abutting the gimbal plate to move the magnetic head towards the first or second disc-shaped recording medium;

the distance between a surface of the gimbal plate touching the pressing member and a surface of the magnetic head facing the first or second disc-shaped recording medium, being set to fall in a range of 0.3 to 0.8 mm.

In the recording and/or reproducing apparatus, since there is provided a magnetic head unit in which the distance between a surface of the gimbal plate put touching the pressing member and a surface of the magnetic head facing the first or second disc-shaped recording medium is set to fall in a range of 0.3 to 0.8 mm, the coil winding concavity can be formed in the intermediate portion of the magnetic head in the direction of the head thickness and the magnetic heads are kept stably in place in relation to the disc-shaped recording medium, thus permitting an improved recording and/or reproduction.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
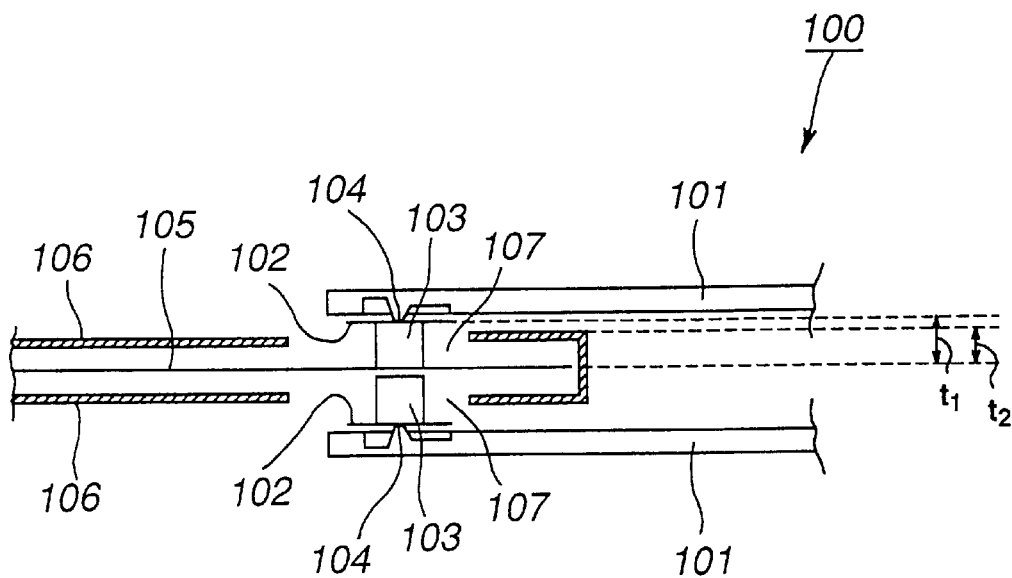
FIG. 1 is a partial sectional view of a conventional magnetic head unit.
Figure 2:
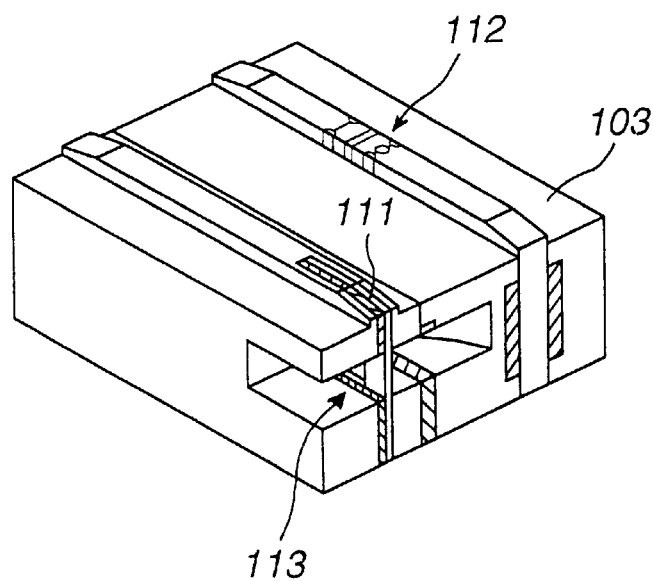
FIG. 2 is a perspective view of a magnetic head of the conventional magnetic head unit in FIG. 1.
Figure 3:
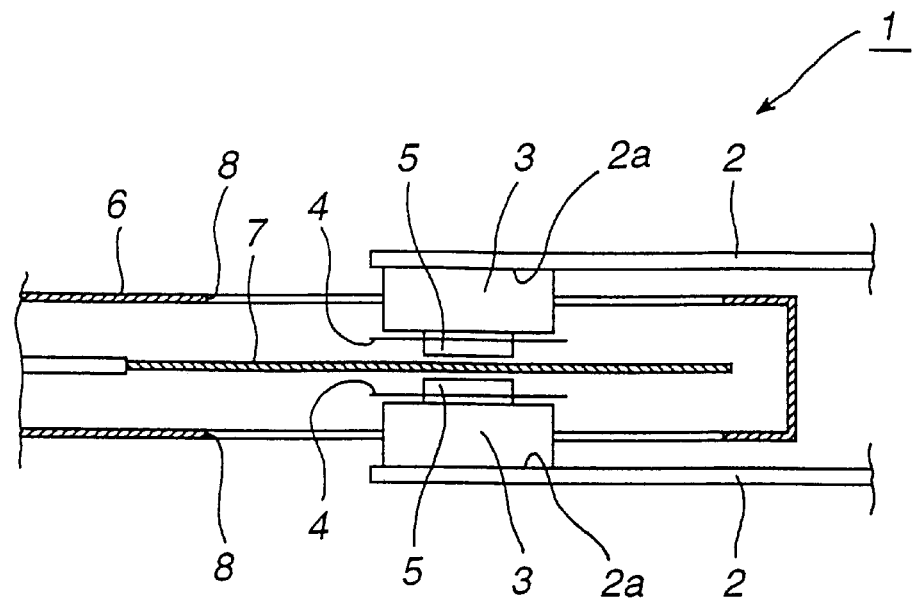
FIG. 3 is a partial sectional view of an essential portion of a magnetic head unit adapted, according to the present invention, to write and read a disc-shaped recording medium.

Referring now to FIG. 3, there is illustrated a magnetic head unit according to the present invention. The magnetic head unit is generally indicated with a reference 1. It comprises a pair of support arms 2, a pair of spacer members 3 installed on free ends 2a, respectively, of the pair of support arms 2, a pair of gimbal plates 4 disposed on the pair of spacer members 3, respectively, and a pair of magnetic heads 5 supported on the gimbal plates 4, respectively, to be movable. In this magnetic head unit 1, the support arms 2 in pair are disposed in parallel to each other so that the magnetic heads 5 in pair are opposite to each other.

The magnetic head unit 1 thus constructed write and/or read signal to and/or from a flexible disc 7 spinnably encased in a cartridge 6. The cartridge 6 has formed therein a pair of openings 8 large enough for the magnetic heads 5 to be introduced into the cartridge 6. Therefore, when the magnetic head unit 1 is used to write or read signal to or from the flexible disc 7, the spacer members 3 in pair, gimbal plates 4 in pair and magnetic heads 5 in pair are introduced through the openings 8 into the cartridge 6 as shown in FIG. 3. Then, the magnetic heads 5 in pair are moved towards each other into contact with main surfaces, respectively, of the flexible disc 7 to write or read signal to or from the flexible disc 7.

Figure 4:
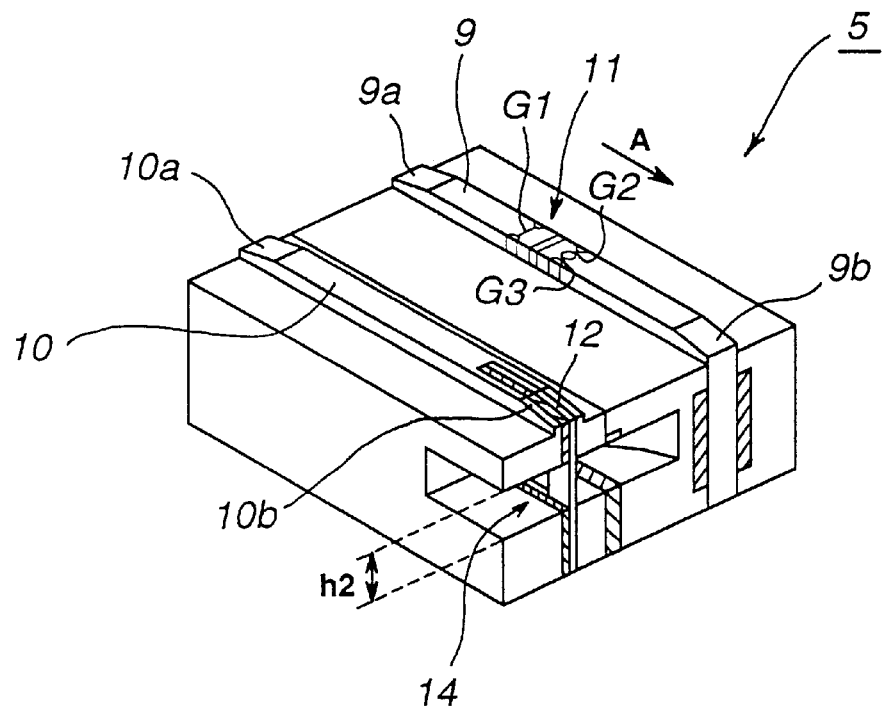
FIG. 4 is a perspective view of a magnetic head included in the magnetic head unit in FIG. 3.

As shown in FIG. 4, each of the pair of magnetic heads 5 has formed on a surface thereof facing the flexible disc 7 first and second rails 9 and 10 generally parallel to a spinning direction, indicated with an arrow A, of the flexible disc 7. The first and second rails 9 and 10 have front tapers 9a and 10a, respectively, formed at front ends thereof located upstream in the spinning direction of the flexible disc 7, and rear tapers 9b and 10b, respectively, formed at rear ends thereof located downstream in the spinning direction of the flexible disc 7. The front tapes 9a and 10a are formed at an angle of about 1 deg., for example, with respect to the surface of the flexible disc 7 while the rear tapers 9b and 10b are formed at an angle of about 10 deg. with respect to the surface of the flexible disc 7.

Each magnetic head 5 has a first magnetic head element 11 installed thereon in such a manner that a magnetic gap of the first magnetic head element 11 faces outwards from a surface of the first rail 9 facing the flexible disc 7 (will be referred to as "medium-facing surface" hereinunder).

The first magnetic head element 11 is a so-called tunnel-erase head comprising a magnetic head disposed nearly in the longitudinal center of the first rail 9 to read or write signal to or from the flexible disc 7 (will be referred to as "read/write head" hereinunder) and a magnetic head disposed downstream with respect to the read/write head in the spinning direction A of the flexible disc 7 (will be referred to as "erase head" hereinunder). The read/write head has a somewhat larger magnetic gap G1 than the width of a recording track on the flexible disc 7. The erase head has further magnetic gaps G2 and G3 provided located in positions, respectively, downstream with respect to the magnetic gap G1 of the read/write head and located at opposite ends of a width of the magnetic gap G1.

The first magnetic head element 11 makes a write to the flexible disc 7 by the magnetic gap G1 of the read/write head. The magnetic gaps G2 and G3 of the erase head erase opposite ends of a signal-written recording track in the direction of the track width, to thereby limit the recording track width formed on the flexible disc 7 to a predetermined value.

The magnetic head unit 1 uses the first magnetic head element 11 to write and/or read with respect to a first one having a lower recording density of the aforementioned two types of flexible discs in a low density medium-oriented mode, namely, in a mode for read/write with respect to a low recording density flexible disc. At this time, in the magnetic head unit 1, write and/or read is made with respect to the first flexible disc by the first magnetic head element 11 with the magnetic head 5 sliding on the signal recording surface of the first flexible disc.

Further, the magnetic head 5 has formed on the second rail 10 thereof a second magnetic head element 12 of which the magnetic gap faces outwards from the rear end of the medium-facing surface of the second rail 10 located downstream in the spinning direction of the flexible disc 7, namely, the end where the rear taper 10b is formed.

The second magnetic head element 12 is a one having a magnetic gap G4 (see FIG. 5) capable of forming a narrower recording track than by the read/write head of the first magnetic head element 11. For example, an MIG (metal in gap) type magnetic head having disposed near the magnetic gap an alloy layer of which the saturation magnetization is high may be used as the second magnetic head element 12.

Figure 5:
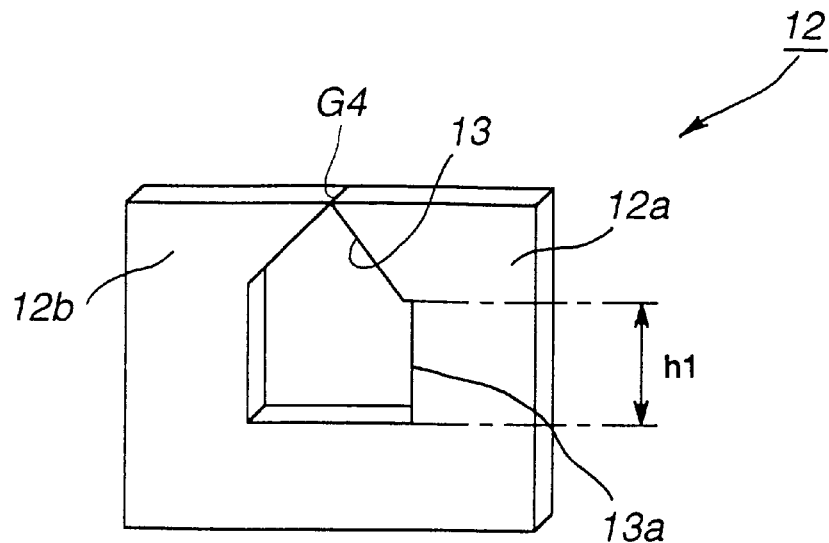
FIG. 5 is a perspective view of an MIG magnetic head used as a second magnetic head element in the magnetic head unit.

As shown in FIG. 5, the second magnetic head element 12 comprises a pair of half magnetic cores 12a and 12b joined integrally to each other via the magnetic gap G4, and a winding recess 13 formed through the core 12 from one to another slicing surface and in which a coil is wound. In the winding recess 13, a coil is wound in an area 13a from the bottom of the recess 13 up to a height h1 (will be referred to as "winding area" hereinunder).

The magnetic head unit 1 uses the second magnetic head element 12 to make a write and/or a read with respect to a second one having a higher recording density of the aforementioned two types of flexible discs in a high density medium-oriented mode, namely, in a mode for read/write with respect to a high recording density flexible disc. At this time, write and/or read is made with respect to the second flexible disc by the second magnetic head element 12 with the magnetic head 5 floating a predetermined distance above the signal recording surface of the second flexible disc.

Further, the magnetic head 5 has a concavity 14 formed therein inwardly from a lateral side at which the second magnetic head element 12 is provided and in which a coil is wound on the second magnetic head element 12. This concavity 14 will be referred to as "coil winding concavity" hereinunder. The coil winding concavity 14 is formed in an intermediate portion of the magnetic head 5 in the direction of the head thickness to have in the direction of the head thickness a dimension h2 generally coincident with the dimension h1 of the winding area 13a of the second magnetic head element 12. The coil winding concavity 14 is open at the lateral of the magnetic head 5.

The second magnetic head element 12 is installed to the magnetic head 5 in such a manner that in the coil winding concavity 14, one of the half magnetic cores 12a and at least the winding area 13a of the winding recess 13 are exposed out. A coil is wound on the exposed-out portion of the second magnetic head element 12.

Figure 6:
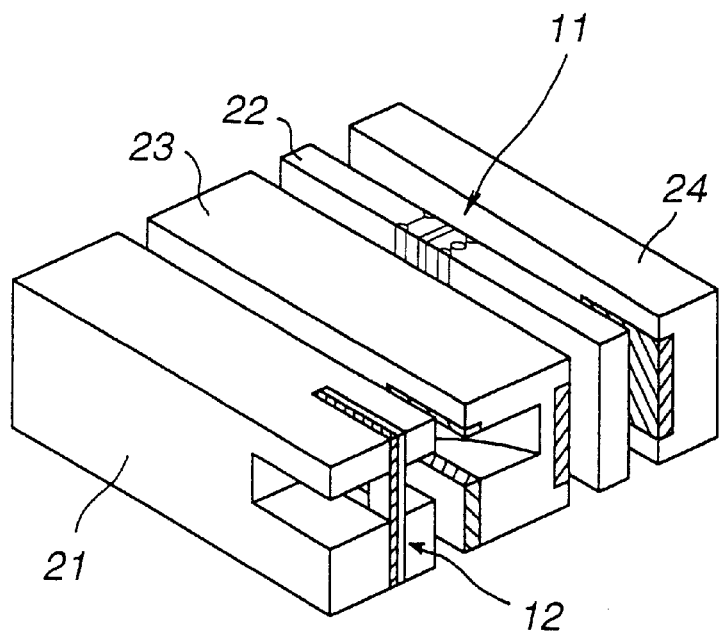
FIG. 6 is an exploded perspective view of a magnetic head included in the magnetic head unit.
Figure 7:
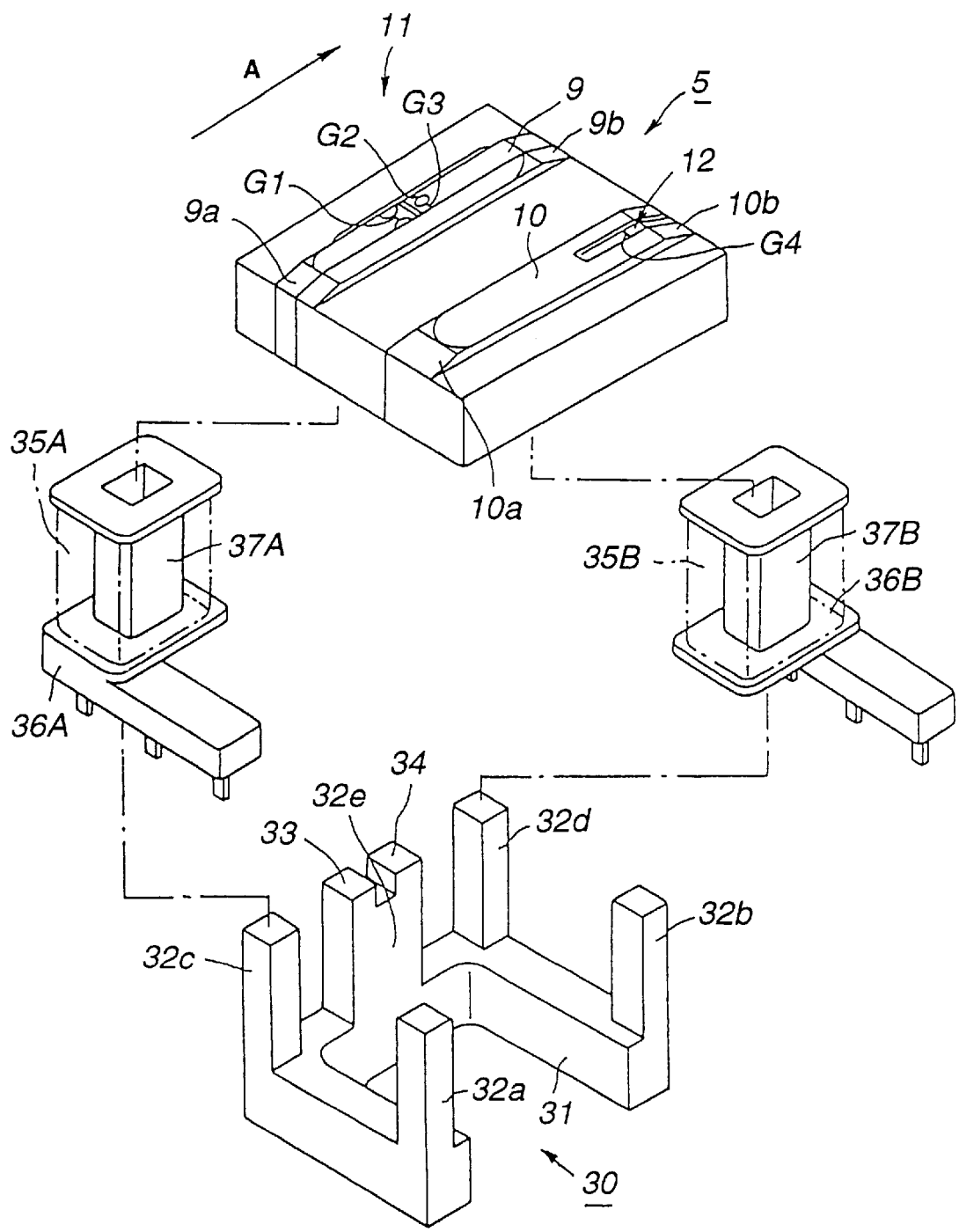
FIG. 7 is a perspective view of the magnetic head, showing a core member installed to the magnetic head.
Figure 8:
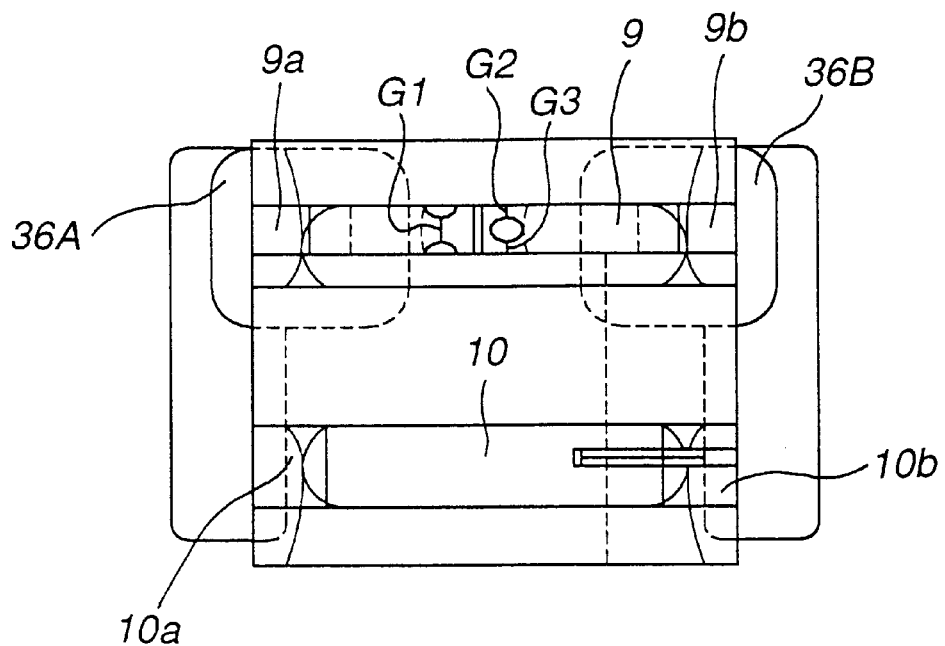
FIG. 8 is a plan view of the magnetic head, showing a core member installed to the magnetic head.
Figure 9:
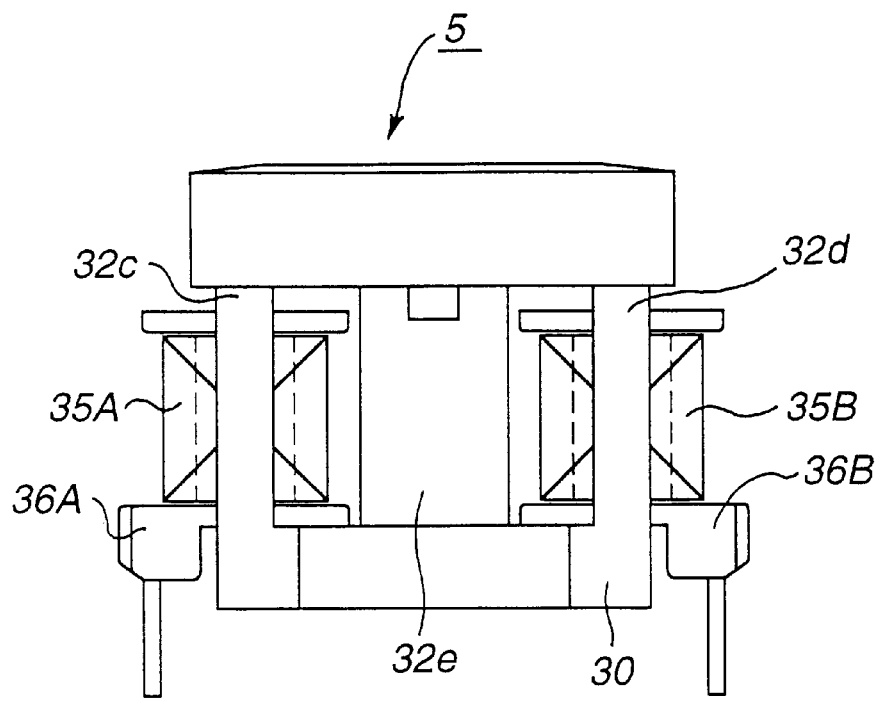
FIG. 9 is a rear view of the magnetic head, showing a core member installed to the magnetic head.
Figure 10:
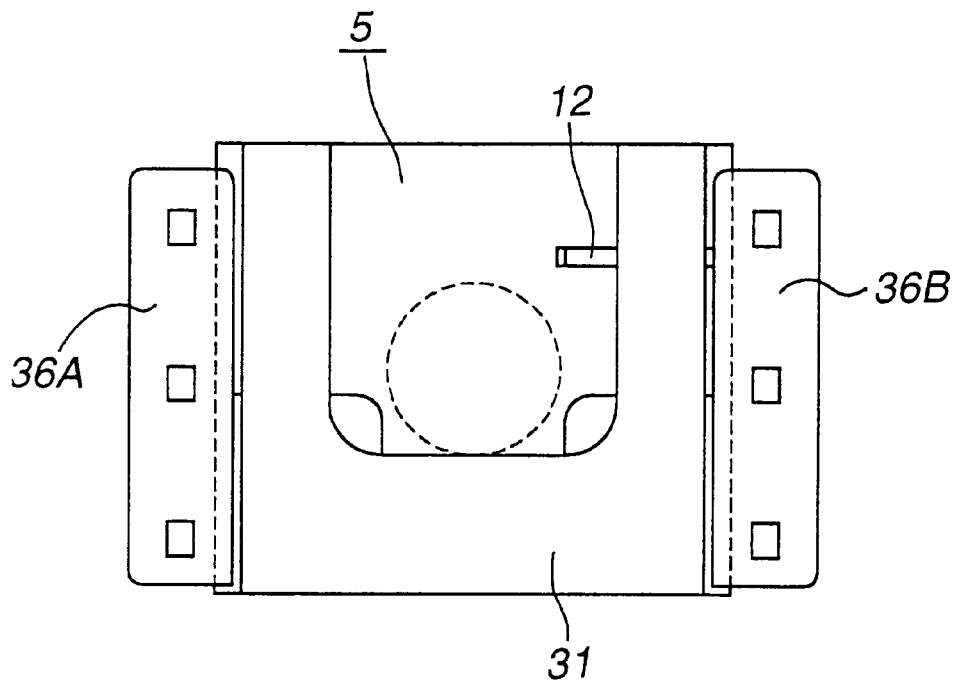
FIG. 10 is a bottom view of the magnetic head, showing a core member installed to the magnetic head.
Figure 11:
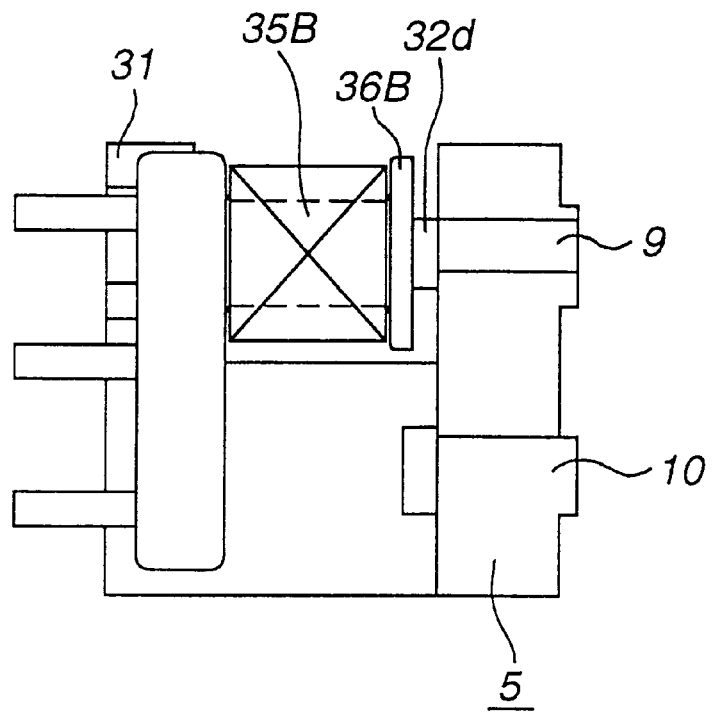
FIG. 11 is a side elevation of the magnetic head, showing a core member installed to the magnetic head.

As shown in FIG. 6, the magnetic head 5 comprises a high density medium-oriented slider 21 in which the second magnetic head element 12 is incorporated, a low density medium-oriented slider 22 in which the first magnetic head element 11 is incorporated, a center slider 23 disposed between the high and low density-oriented sliders 21 and 22, and a side slider 24 disposed in relation to the center slider 23 to sandwich the low density medium-oriented slider 22 between them. That is, the magnetic head 5 is formed from the high density medium-oriented slider 21, center slider 23, low density medium-oriented slider 22 and side slider 24 disposed in this order and joined integrally to one another with a low melting point glass or the like.

In the magnetic head 5, the second rail 10 is formed on a surface of the high density medium-oriented slider 21 facing the flexible disc 7 while the first rail 9 is formed on a surface of the low density medium-oriented slider 22 facing the flexible disc 7. In this magnetic head 5, the first and second rails 9 and 10 are formed on the surface facing the flexible disc 7 so that there is defined between the magnetic head 5 and flexible disc 7 an air film which allows the magnetic head 5 to float a predetermined distance above the spinning flexible disc 5 when a write or read is made in the high density medium-oriented mode to the flexible disc 7.

As shown in FIGS. 7 to 11, the magnetic head 5 has formed, via the gimbal plate 4 as will be described later, on a surface thereof opposite to the surface thereof facing the flexible disc 7 a core member 30 which forms the magnetic core of the first magnetic head element 11.

The core member 30 comprises a base 31 made of a magnetic material and formed to have a generally U shape, first and second legs 32a and 32b made of a nonmagnetic material and rising upward from ends of the base 31, third and fourth legs 32c and 32d made of a magnetic material and rising upward from corners of the base 31, and a fifth leg 32e located between the third and fourth legs 32c and 32d and rising upward from the base 31. The fifth leg 32e has formed in the top end face thereof a cut which separates the top end face of the fifth leg 32e into first and second end faces 33 and 34.

The third leg 32c has installed thereon a first coil block 36A on which there is wound a coil 35A to actuate the read/write head of the first magnetic head element 11.

The first coil block 36A has a coil 35A and a first bobbin 37A on which the coil 35A is wound. The first bobbin 37A is formed to have an L shape and has a cylindrical portion provided with a pair of upper and lower flanges. In the first bobbin 37A, the inner wall of the cylindrical portion is formed to be generally same as the outer surface of the third leg 32c.

The fourth leg 32d has installed thereon a second coil block 36B on which there is wound a coil 35B to actuate the erase head of the first magnetic head element 11.

The second coil block 36B has a coil 35B and a second bobbin 37B on which the coil 35B is wound. The second bobbin 37B is formed to have an L shape and has a cylindrical portion provided with a pair of upper and lower flanges. In the second bobbin 37B, the inner wall of the cylindrical portion is formed to be generally same as the outer surface of the fourth leg 32d.

The first and second coil blocks 36A and 36B have the cylindrical portions thereof installed on the third and fourth legs 32c and 32d, respectively, with the coils 35A and 35B thereof wounded on the first and second bobbins 37A and 37B, respectively.

With the first coil block 36A thus installed on the third leg 32c and the second coil block 36B installed on the fourth leg 32d, the core member 30 abuts the surface of the magnetic head 5 opposite to the surface of the magnetic head 5 facing the flexible disc 7. At this time, the first and second legs 32a and 32b abut at the top end faces thereof both the near-corner portions of the magnetic head 5 at which the second magnetic head element 12 is installed. The third leg 32c abuts the magnetic head 5 for the top end face thereof to be magnetically connected to the read/write head of the first magnetic head element 11. Further, the fourth leg 32d abuts the magnetic head 5 for the top end face thereof to be magnetically connected to the erase head of the first magnetic head element 11. Moreover, the fifth leg 32e is positioned between the read/write head and erase head of the first magnetic head element 11 and abuts the magnetic head 5 for the first end face 33 thereof to be magnetically connected to the read/write head and for the second end face 34 to be magnetically connected to the erase head.

As the core member 30 abuts the magnetic head 5 as mentioned above, the third and fifth legs 32c and 32e form together a magnetic core in the read/write head of the first magnetic head element 11. That is, in the read/write head, the third leg 32c to which the first coil block 36A is installed, base 31 and the fifth leg 32e having the first end face 33 form together a magnetic circuit.

Also, as the core member 30 abuts the magnetic head 5, the fourth and fifth legs 32*d* and 32*e* form together a magnetic core in the erase head of the first magnetic head element 11. That is, in the erase head, the fourth leg 32*d* to which the second coil block 36B is installed, base 31 and the fifth leg 32*e* having the second end face 34 form together a magnetic circuit.

Figure 12:
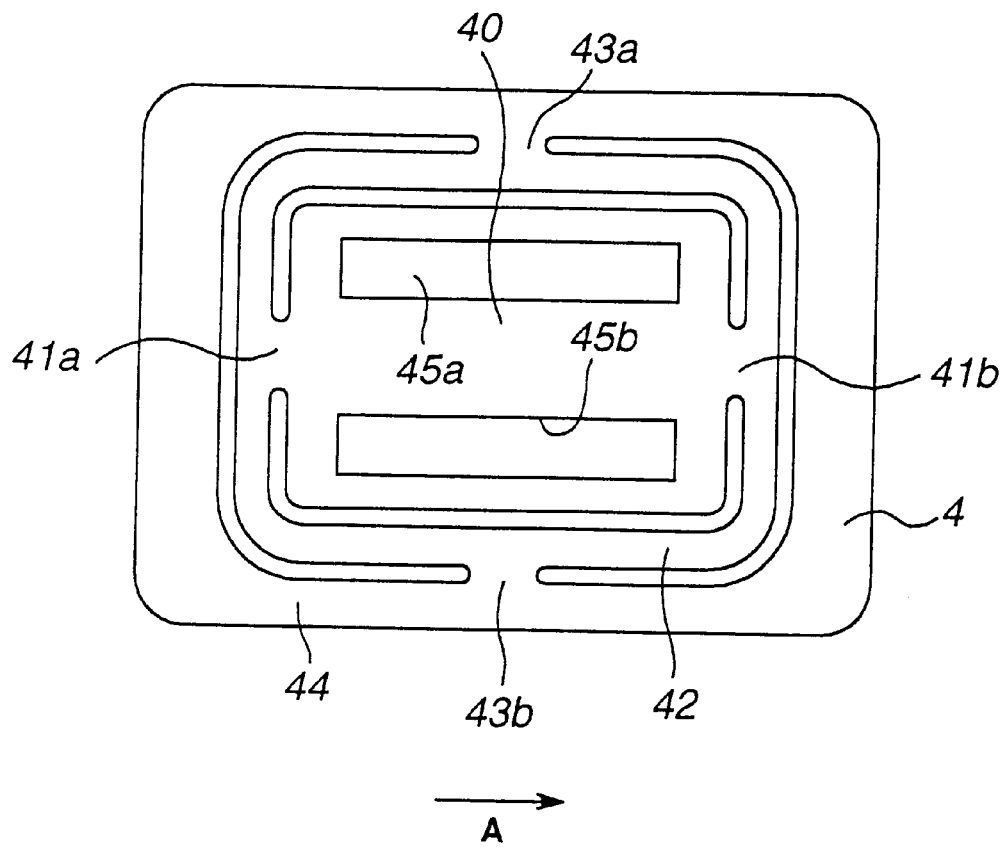
FIG. 12 is a plan view of a gimbal plate included in the magnetic head unit.
Figure 13:
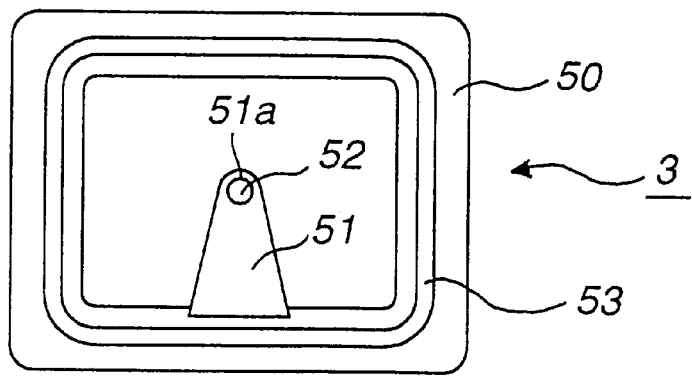
FIG. 13 is a plan view of a spacer member included in the magnetic head unit.
Figure 14:
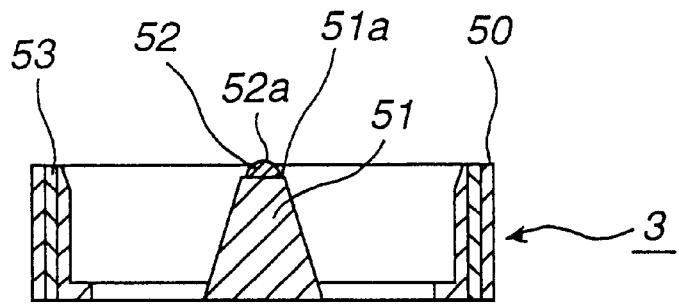
FIG. 14 is a cross-sectional view of the spacer member included in the magnetic head unit.
Figure 15:
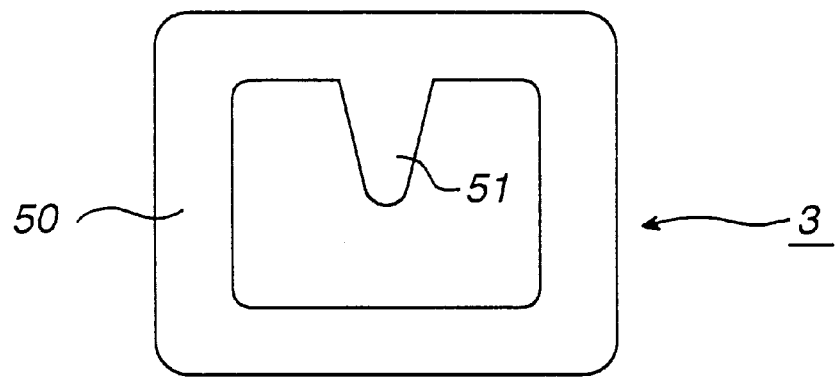
FIG. 15 is a bottom view of the spacer member included in the magnetic head unit.
Figure 16:
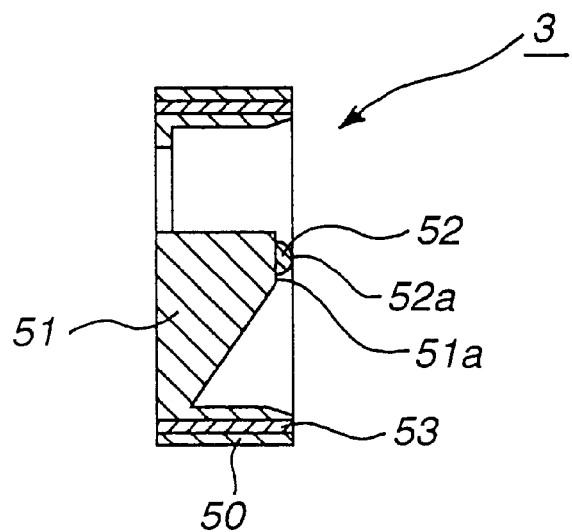
FIG. 16 is a cross-sectional view of the spacer member included in the magnetic head unit.
Figure 17:
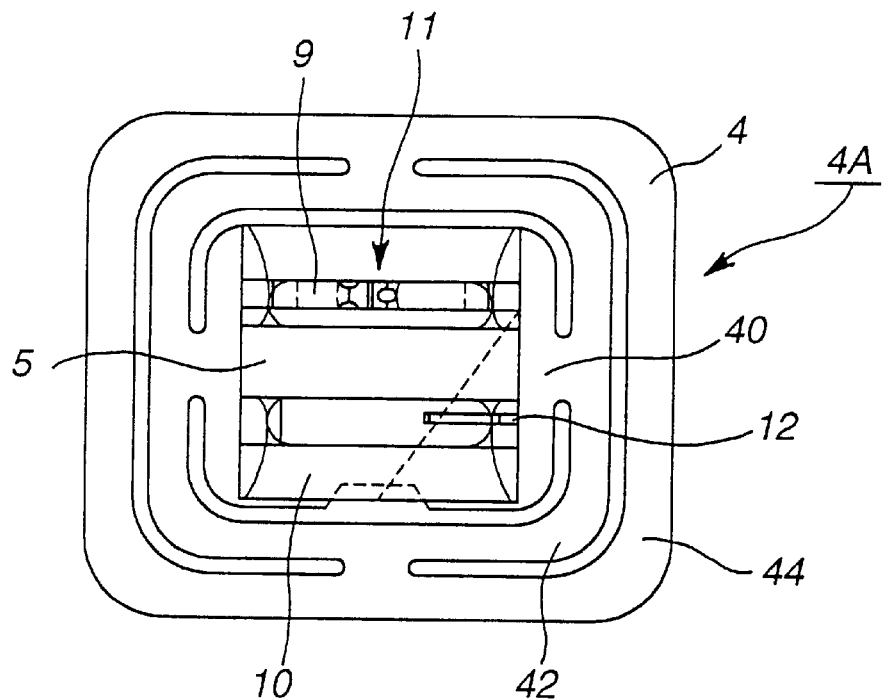
FIG. 17 is a plan view of the magnetic head, gimbal plate, spacer member and the magnetic core member assembled in the magnetic head unit.
Figure 18:
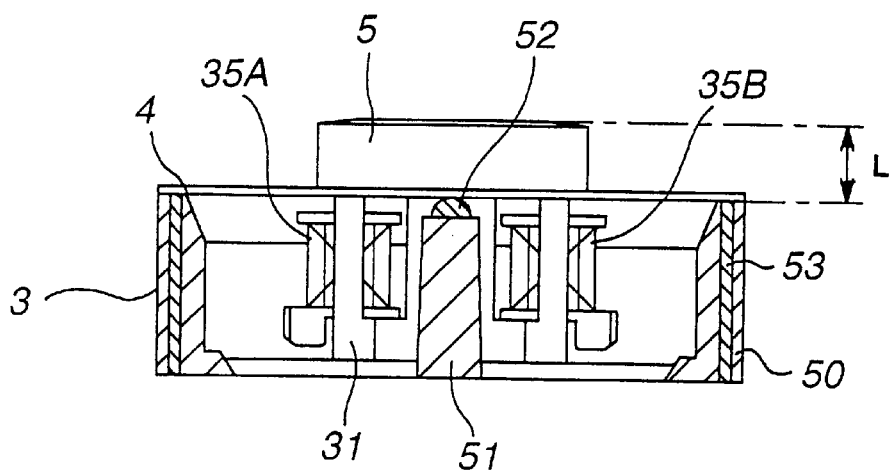
FIG. 18 is a cross-sectional view of the magnetic head, gimbal plate, spacer member and the magnetic core member assembled in the magnetic head unit.
Figure 19:
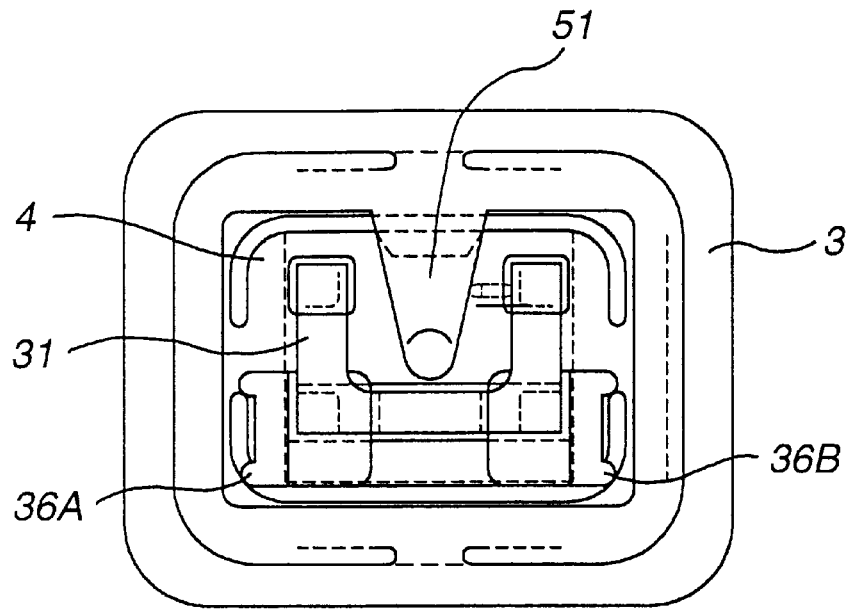
FIG. 19 is a bottom view of the magnetic head, gimbal plate, spacer member and the magnetic core member assembled in the magnetic head unit.
Figure 20:
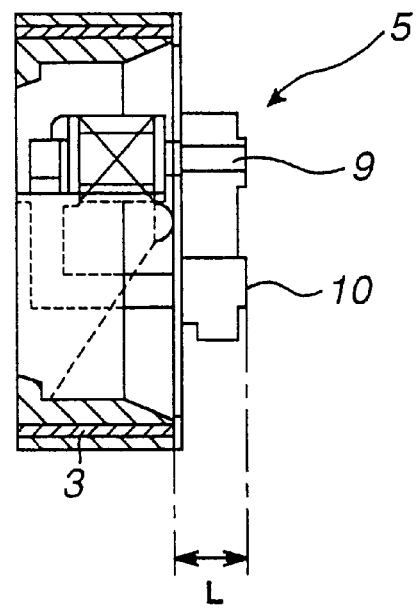
FIG. 20 is a side elevation of the magnetic head, gimbal plate, spacer member and the magnetic core member assembled in the magnetic head unit.

On the other hand, the gimbal plate 4 disposed on the surface of the magnetic head 5 opposite to the surface of the magnetic head 5 facing the flexible disc 7 comprises a head support 40 formed as a whole to be a generally rectangular plate to support the magnetic head 5, a first annular frame 42 coupled to the head support 50 via first couplings 41*a* and 41*b* to enclose the outer surface of the head support 40, and a second annular frame 44 coupled to the first annular frame 42 via second couplings 43*a* and 43*b* to enclose the outer surface of the first annular frame 42, as will be seen from FIG. 12. Also, the gimbal plate 4 is constructed so that a straight line connecting the first couplings 41*a* and 41*b* is perpendicular to a straight line connecting the second couplings 43*a* and 43*b*. In addition, the straight line connecting the first couplings 41*a* and 41*b* is parallel to the spinning direction A of the flexible disc 7. Note that the gimbal plate 4 is formed from a stainless steel, for example.

Of the gimbal plate 4, the head support 40 is formed to have a contour somewhat larger than that of the magnetic head 5. The head support 40 has formed therein a pair of openings 45*a* and 45*b* spaced from each other in a direction perpendicular to the spinning direction A of the flexible disc 7.

The gimbal plate 4 thus constructed is disposed between the magnetic head 5 and the above-mentioned core member 30 at the surface of the magnetic head 5 opposite to the surface of the magnetic head 5 facing the flexible disc 7. At this time, the third to fifth legs 32*c* to 32*e* of the core member 30 abut at the top end faces thereof the bottom end of the first magnetic head element 11 installed to the magnetic head 5 through the opening 45*a* formed in the gimbal plate 4. Also, the first and second legs 32*a* and 32*b* of the core member 30 abut at the top end faces thereof the near-corner portions of the magnetic head 5 at which the second magnetic head element 12 is installed, through the opening 45*b* in the gimbal plate 4.

Therefore, the opening 45*a* is formed to have a size large enough for insertion of the third to fifth legs 32*c* to 32*e* of the core member 30. Also, the opening 45*b* is formed to have a size large enough for insertion of the first and second legs 32*a* and 32*b* of the core member 30.

The gimbal plate 4 constructed as in the above is supported by the spacer member 3 disposed to enclose the core member 30.

As shown in FIGS. 13 to 16, the spacer member 3 comprises a surrounding wall 50 formed to have a generally annular shape, a pivot mount 51 rising inside the surrounding wall 50, and a pivot 52 disposed on the pivot mount 51.

The surrounding wall 50 is formed cylindrical of which the inner surface is somewhat larger than the contour of the core member 30 and the contour is generally same as that of the aforementioned gimbal plate 4. The surrounding wall 50 has provided therein a magnetic shielding member 53 made of a highly permeable magnetic material, for example, and formed to have a contour a little smaller than the surrounding wall 50.

The pivot mount 51 is formed to extend nearly from the center of the inner surface of the surrounding wall 50 and rise upward from near the center. It is formed also to be somewhat lower than the surrounding wall 50. The pivot mount 51 has formed on an end face 51*a* thereof a pivot 52 abutting the gimbal plate 4 to press the magnetic head 5 towards the flexible disc 7. The pivot 52 is formed generally semispherical for a top end face 52*a* thereof to be a little above the height of the surrounding wall 50 while being mounted on the pivot mount 51.

The spacer member 3 thus constructed is formed by forming the surrounding wall 50, pivot mount 51 and pivot 52 integrally with one another. At this time, the spacer member 3 should preferably be insert-molded to dispose the magnetic shielding member 53 inside the surrounding wall 50.

As shown in FIGS. 17 to 20, the spacer member 3 is fixed to the surface of the gimbal plate 4 opposite to the surface of the gimbal plate 4 facing the magnetic head 5. Thus, the pivot 52 abuts nearly the center of the surface of the gimbal plate 4 opposite to the surface of the gimbal plate 4 supporting the magnetic head 5 to force the center with a predetermined pressure. Therefore, the magnetic head 5 supported to the gimbal plate 4 is pressed to the flexible disc 7 by the pivot 52 under the predetermined pressure via the gimbal plate 4.

The magnetic head unit 1 can make stable write and record with respect to the flexible disc 7 by pressing the magnetic head 5 towards the flexible disc 7 by means of the pivot 52 to allow the magnetic head 5 to follow up with the moving flexible disc 7.

Even when the magnetic head 5 is forced towards the flexible disc 7 by the pivot 52, if the distance L between the surface of the gimbal plate 4 pressed by the pivot 52, namely, the surface of the gimbal plate 4 opposite to the surface of the gimbal plate 4 supporting the magnetic head 5, and the surface of the magnetic head 5 facing the flexible disc 7, namely, the surface of the magnetic head sliding in contact with the flexible disc 7, is large, the magnetic head 5 is applied with a force to incline the magnetic head 5 during spinning of the flexible disc 7 or seeking operation of the magnetic head unit 1, for example, resulting in that the magnetic head 5 cannot be kept in a stable posture in relation to the flexible disc 7.

More particularly, when a write or read is made in the high density mediumoriented mode to the second flexible disc having a high recording density, the second flexible disc is spun at a speed as high as 3,600 rpm, for example, so that the spinning will apply a large force to the magnetic head 5 of which the posture in relation to the second flexible disc cannot hardly be maintained, thus deteriorating the write/read characteristic of the magnetic head 5.

Figure 21:
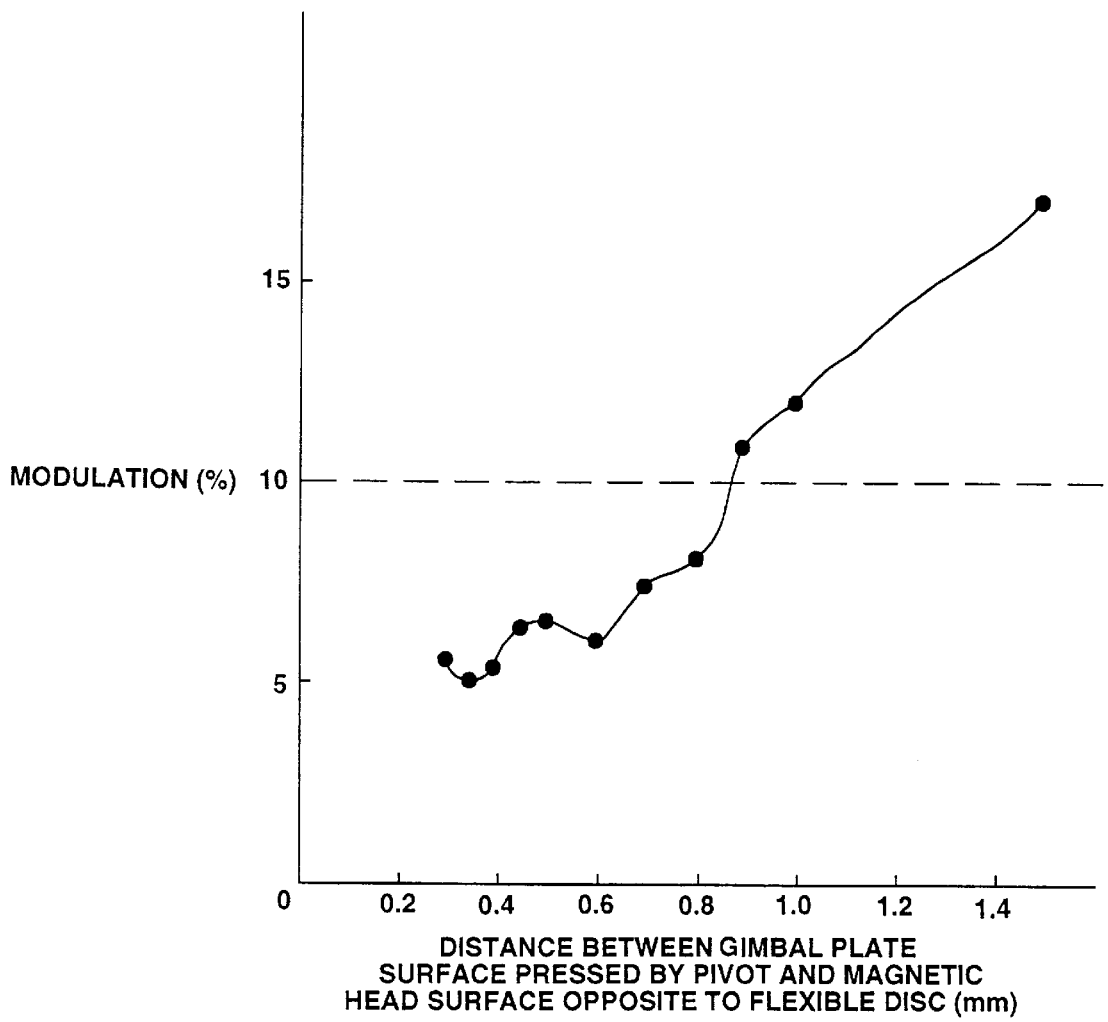
FIG. 21 shows the relationship between a distance between a surface of the gimbal plate pressed by the pivot and a surface of the magnetic head facing the flexible disc, and the write/read characteristic of the magnetic head.

FIG. 21 shows the relationship between a distance L between the surface of the gimbal plate 4 pressed by the pivot 52 and the surface of the magnetic head 5 facing the flexible disc 7, and the write/read characteristic of the magnetic head 5. As shown, the horizontal axis indicates the distance L, while the vertical axis indicates a variation of the read signal as the flexible disc rotates one turn, namely, a ratio of a difference between high and low read outputs (will be referred to as "modulation" hereinunder) with the whole read output.

As seen from FIG. 21, the ratio of the modulation with the whole read output increases little by little as the distance L increases, although it varies somehow. When the distance L is within a range of 0.8 to 0.9 mm, the modulation ratio exceeds 10%.

For the recording and/or reproducing apparatus using the magnetic head unit 1 according to the present invention, it is required that the modulation ration should be 10% or less. Therefore, in the magnetic head unit 1 of the present invention, the distance L is set 0.8 mm or less so that the modulation ratio is 10% or less with some variation taken in consideration.

As aforementioned, the distance L should desirably be as small as possible in order to prevent deterioration of the write/read characteristic of the magnetic head 5 by setting the modulation ratio to be smaller. On the other hand, however, if the distance L is set too small, the lateral side of the magnetic head 5 will have no sufficient dimension for forming the coil winding concavity 14 in which the coil is wound on the second magnetic head element 12.

Figure 22:
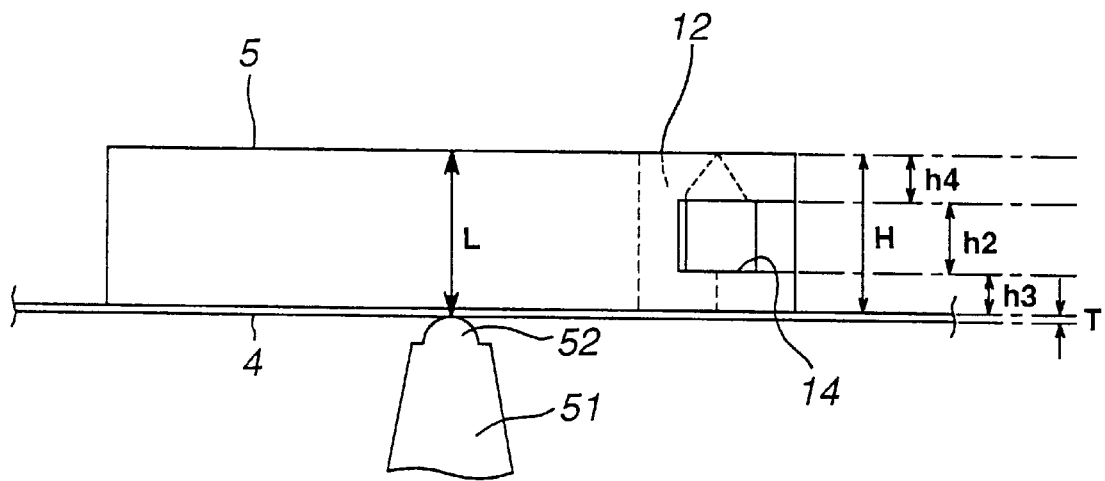
FIG. 22 is a schematic diagram showing the distance between the surface of the gimbal plate pressed by the pivot and the surface of the magnetic head facing the flexible disc.

The distance L is a sum of the thickness T of the gimbal plate 4 and the thickness H of the magnetic head 5 as shown in FIG. 22. The thickness H of the magnetic head 5 is a sum of a distance h3 between the surface of the magnetic head 5 supported by the gimbal plate 4 and the bottom of the coil winding concavity 14, a dimension h2 of the coil winding concavity 14 in the direction of the magnetic head thickness, and a distance h4 from the top of the coil winding concavity 14 to the surface of the magnetic head 5 facing the flexible disc 7.

The distance h3 between the surface of the magnetic head 5 supported by the gimbal plate 4 and the bottom of the coil winding concavity 14 corresponds to the length of the back depth of the second magnetic head element 12. Therefore, the distance h3 has to be at least 0.08 mm for a smaller magnetic resistance of the second magnetic head element 12 to attain an improved write/read characteristic.

Since the dimension h2 of the coil winding concavity 14 in the direction of the magnetic head thickness is generally equal to the dimension h1 of the winding area 13*a* of the second magnetic head element 12 as mentioned in the foregoing, it has to be at least 0.13 mm for winding a coil a necessary number of turns in order to meet the characteristic requirements for the second magnetic head element 12.

The surface of the magnetic head 5 facing the flexible disc 7 is worked to form the first and second rails 9 and 10. To prevent the surface of the magnetic head 5 where the rails 9 and 10 are to be formed from being broken due to the working for the rails 9 and 10 and addition of an applied pressure, the distance h4 from the top of the coil winding concavity 14 to the surface of the magnetic head 5 facing the flexible disc 7 has to be at least 0.06 mm.

For the above reasons, the thickness H of the magnetic head 5 has to be at least 0.27 mm in order to provide a sufficient dimension for forming the coil winding concavity 14 while meeting the characteristic requirements for the magnetic head 5. To assure a sufficient rigidity of the gimbal plate 4 to support the magnetic head 5, the gimbal plate 4 has the thickness T of at least 0.03 mm. Therefore, the distance L should be set 0.3 mm or more.

In the magnetic head unit 1 according to the present invention, the distance L is set to fall in a range of 0.3 to 8.0 mm.

Figure 23:
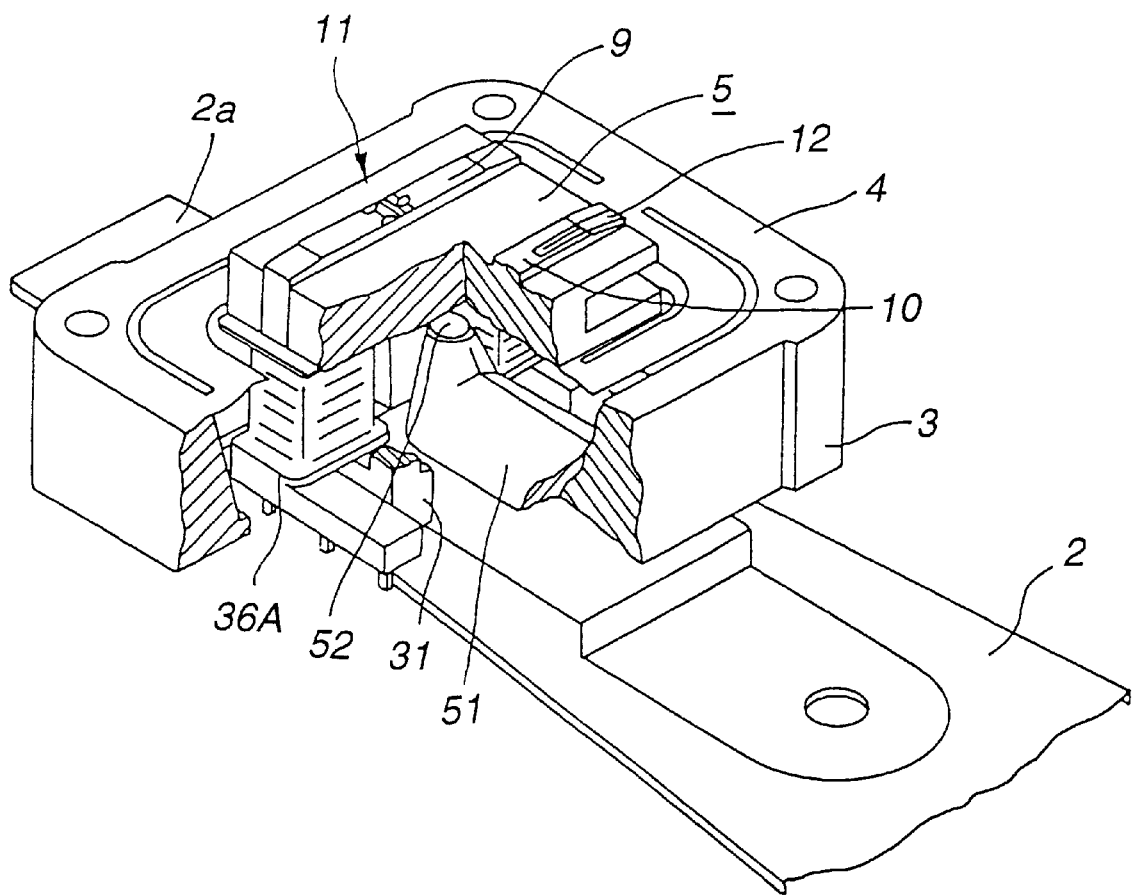
FIG. 23 is a partially fragmentary perspective view of the magnetic head, gimbal plate, spacer member and magnetic core member installed to the support arm.

As shown in FIG. 23, in the magnetic head unit 1, the magnetic head 5 is supported on the gimbal plate 4 and forced towards the flexible disc 7 by the pivot 52 under a predetermined pressure, and installed to the free end 2*a* of each of the support arms 2 in pair. It should be noted that in FIG. 23, only one of the pair of support arms 2 is illustrated.

The support arm 2 is formed from a plate having a predetermined length and connected at the base end thereof to a magnetic head driving means (not shown) of the recording and/or reproducing apparatus. The support arm 2 has the spacer member 3 installed to the free end 2*a* thereof. At this time, the spacer member 3 is installed, at an end face thereof opposite to the end face thereof to which the gimbal plate 4 is installed, to the free end 2*a* of the support arm 2. The magnetic heads 5 are installed to the pair of support arms 2, respectively, to be opposite to each other.

In the magnetic head unit 1, the height from the support arm 2 to the first and second magnetic head elements 11 and 12 can be limited by designing the spacer member 3 to have a predetermined height. That is, in the magnetic head unit 1, the support arm 2 can be kept not in contact with the cartridge 6 while the magnetic head 5 is positioned for write or read with respect to the flexible disc 7. In other words, the spacer member 30 has such a height that during write or read with respect to the flexible disc 7, the support arm 2 will not be put in contact with the cartridge 6.

The magnetic head unit 1 constructed as mentioned in the above is installed in a recording and/or reproducing apparatus adapted to write and read two types of flexible discs different in recording density from each other to write or read signal to or from a flexible disc set in the apparatus.

More particularly, the first flexible disc having a low recording density is set in the recording and/or reproducing apparatus. It will be spun at a speed of about 300 rpm, for example, by a spindle motor provided in the apparatus. The magnetic head unit 1 will allow the magnetic head 5 to slide on the signal recording surface of the first flexible disc being spun. Thus, the first magnetic head element 11 will write or read signal to or from the first flexible disc in the low density medium-oriented mode.

That is, a magnetic field generated from the first coil block 36A installed on the third leg 32*c* of the core member 30 forms a magnetic circuit between the third leg 32*c*, base 31, fifth leg 32*e* and read/write head of the first magnetic head element 11. Thus the read/write head will form a recording track on the first flexible disc being spun. At a same time, a magnetic field generated from the second coil block 36B installed on the fourth leg 32*d* of the core member 30 forms a magnetic circuit between the fourth leg 32*d*, base 31, fifth leg 32*e* and erase head of the first magnetic head element 11. Thus the erase head will erase only portions, near the opposite ends in the direction of track width, the recording track having been formed on the first flexible disc by the read/write head. Therefore, the flexible disc will have formed thereon a recording track having a desired width.

Also, when the second flexible disc having a high recording density is set in the recording and/or reproducing apparatus, it will be spun at a speed of about 3,600 rpm, for example, by a spindle motor provided in the apparatus. The spinning of this second flexible disc at this high speed will cause an air flow which will allow the magnetic head 5 to float a distance of about 50 nm above the signal recording surface of the second flexible disc being spun. The second magnetic head element 12 will write or read signal to or from the second flexible disc in the high density medium-oriented mode.

As mentioned above, the magnetic head unit can write and read with respect to a flexible disc in the low or high density medium-oriented mode. The first or second flexible disc being spin will incur some vibration or axial runout. Since in the magnetic head unit according to the present invention, the magnetic head 5 is supported by the gimbal plate 4 to be movable, the magnetic head 5 will accommodate such a vibration or axial runout.

In the magnetic head unit 1 according to the present invention, the distance L between the surface of the gimbal plate 4 pressed by the pivot 52 and the surface of the magnetic head 5 facing the flexible disc 7 is set to fall in a range of 0.3 to 0.8 mm, the magnetic head 5 can have a sufficient dimension for providing the coil winding concavity 14 in the intermediate portion thereof in the direction of the thickness of the magnetic head 5 and the magnetic head 5 can be kept in a stable posture in relation to the flexible disc 7, thus assuring the magnetic head to have an improved write/read characteristic.

The recording and/reproducing apparatus employing the magnetic head unit 1 according to the present invention is used to write data to a flexible disc or the like in personal computers, word processors, etc.

Figure 24:
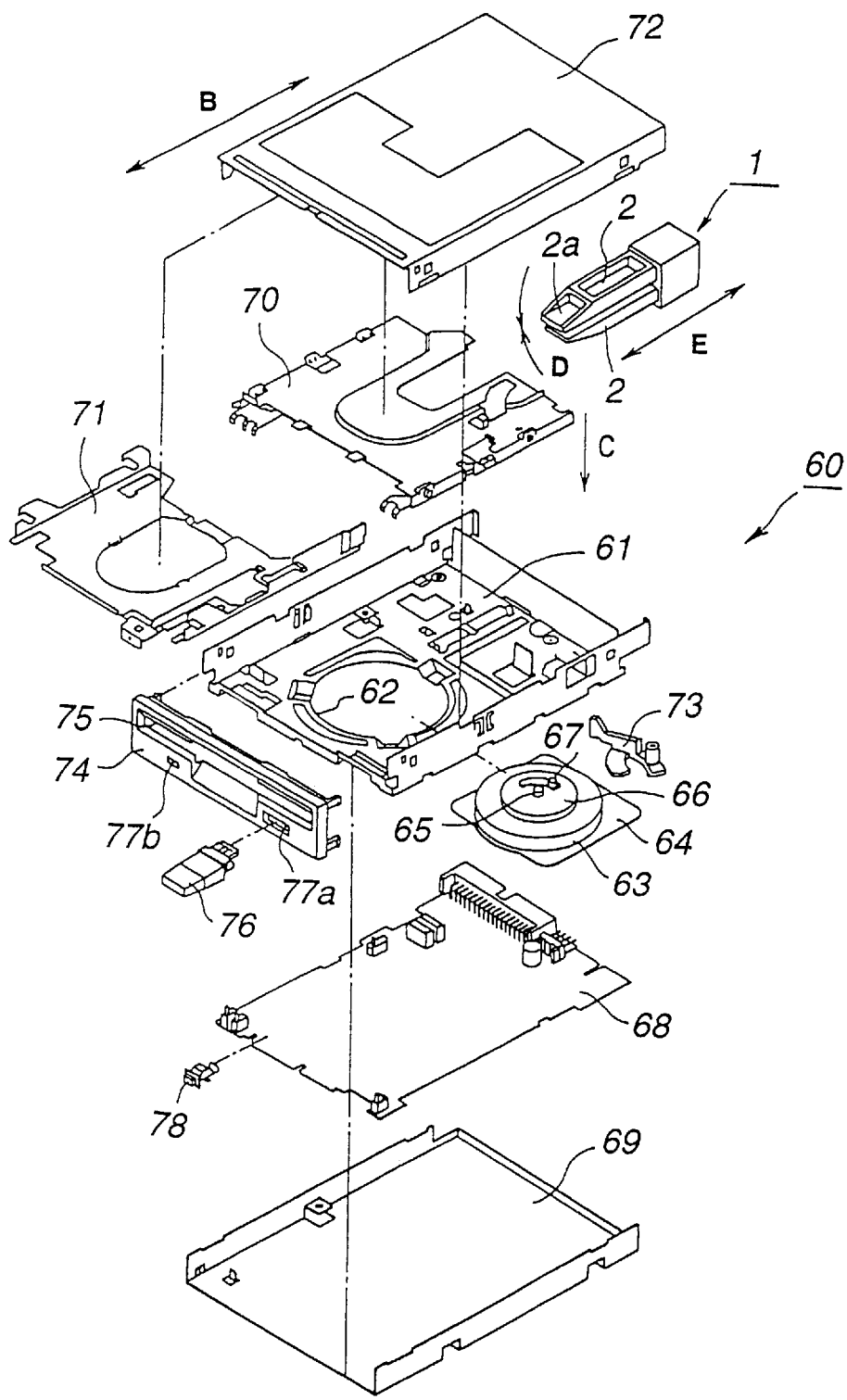
FIG. 24 is an exploded perspective view of the recording and/or reproducing apparatus according to the present invention.

Referring now to FIG. 24, there is illustrated a recording and/or reproducing apparatus according to the present invention. The recording and/or reproducing apparatus is generally indicated with a reference 60. The recording and/or reproducing apparatus 60 comprises a chassis 61 designed generally flat, and a spindle motor 63 disposed fit in a motor fixing opening 62 formed nearly in the center of the chassis 61 and facing the upper surface of the chassis 61. The spindle motor 63 is provided on a stator base 64 to drive to spin the flexible disc 7. The spindle motor 63 is provided with a spindle shaft 65 on which a disc-shaped disc table 66 on which the flexible disc 7 is set is installed. The spindle shaft 65 is projected at the free end thereof in the center of the upper main surface of the disc table 66. The spindle shaft 65 is fitted into a central hole of the flexible disc 7 set on the disc table 66.

The disc table 66 has a chucking pin 67 disposed in the upper main surface of thereof. Also, the disc table 66 has disposed on the upper main surface thereof a magnet (not shown) to attract the flexible disc 7. The magnet is a so-called rubber magnet having a generally annular shape.

The chassis 61 has an electronic circuit board 68 installed on a bottom surface thereof. The electronic circuit board 68 has disposed thereon a variety of electronic circuits and detection switches. Furthermore, there is provided under the chassis 61 a lower cover 69 to cover the bottom of the electronic circuit board 68.

There is disposed on the chassis 61 a cartridge holder 70 which holds the cartridge 6 and sets the flexible disc 7 inside the cartridge 6 onto the disc table 66. More particularly, the cartridge holder 70 will receive and hold the cartridge 6 introduced from the front of the recording and/or reproducing apparatus 60, be driven to move downward, and place the flexible disc 7 in the cartridge 6 onto the disc table 66. The cartridge holder 70 is designed like a thin enclosure open at the front and bottom thereof to receive the cartridge 6 introduced from front of the recoding and/or reproducing apparatus.

Furthermore, there are provided on the chassis 61 a cam plate 71 to move the cartridge holder 70 up and down and a driving panel 72 to move the cam plate 71 back and forth. The cam plate 71 is disposed between the cartridge holder 70 and chassis 61 and has a pair of side walls each having a cam recess formed in either lateral edge thereof. The cam recess in the lateral wall has engaged therein a mating pin projected from either lateral side of the cartridge holder 70. The driving plate 72 is located above the cartridge holder 70 and coupled to the cam plate 71. Namely, when the driving plate 72 is moved back or forth, the cam plate 71 is moved back or forth following the driving plate 72 in the direction of arrow B in FIG. 24. While the cam plate 71 is positioned at the rear portion of the chassis 61, the cartridge holder 70 stays in an upper position where the flexible disc 7 in the cartridge 6 is separated upward from the disc table 66. When the cam plate 71 is slid to the front of the chassis 61, the cartridge holder 66 is lowered in the direction of arrow C in FIG. 24 to a lower position where the flexible disc 7 in the cartridge 6 is set onto the disc table 66. The cam plate 71 is elastically forced forward by a forcing member (not shown). There is provided at the upper rear of the chassis 61 a lock lever 73 to lock the cam plate 71 in a rear position on the chassis 61.

The chassis 61 has formed at a front edge thereof a front panel 74 in which there is formed a slit 75 through which the cartridge 6 is introduced or removed. The front panel 74 has formed therein an opening 77a through which an eject button 78 faces frontward out and another opening 77b through which an indicator lamp 78 faces frontward out. When the eject button 76 is pressed from the front, it will move the driving plate 72 backward to move the cam plate 71 also backward and apply the lock lever 73 to lock the cam plate 71.

Further, the chassis 61 has the magnetic head unit 1 positioned at the rear portion of the recording and/or reproducing apparatus 60. As having previously been described, there is in the magnetic head unit 1 the spacer member 3 disposed on the free end 2a of each of the pair of the support arms 2 to be opposite to each other. The magnetic head 5 is installed to the spacer member 3 via the gimbal plate 4. The support arms 2 are elastically forced towards the free ends 2a thereof in the direction of arrow D in FIG. 24. Namely, in the magnetic head unit 1, the magnetic heads 5 in pair are forced towards each other. The support arms 2 are movable back and forth, namely, in the directions towards and away from the spindle motor 63, as indicated with an arrow E in FIG. 24.

The disc cartridge 6 is introduced into the recording and/or reproducing apparatus 60 through the slit 65 in the front panel 64 from the front of the apparatus 60. The disc cartridge 6 is received and held in the cartridge holder 70. At this time, the openings 8 of the disc cartridge 6 are closed. The flexible disc 7 facing outside the disc cartridge 6 through the openings 8 is inserted between the pair of support arms 2 of the magnetic head unit 1. At this time, the magnetic heads 5 of the magnetic head unit 1 are facing the respective opposite surfaces of the flexible disc 7. The magnetic head 5 are elastically forced towards the main surfaces of the flexible disc 7 by the pair of support arms 2. Namely, the magnetic heads 5 are forced to the main surfaces of the flexible disc 7 by the support arms 2 when the flexible disc 7 is stopping spinning.

In the recording and/or reproducing apparatus 60, the magnetic head unit 1 writes or reads data signal to or from the flexible disc 7 being spun at a predetermined speed. At this time, the recording and/or reproducing apparatus 60 operates in the low density medium-oriented mode in which the first magnetic head element 11 writes or reads signal to or from the first flexible disc having a low recording density being driven to spin at a relatively low speed, and in the high density medium-oriented mode in which the second magnetic head element 12 writes or reads signal to or from the second flexible disc having a high recording density being driven to spin at a relatively high speed.

In any case, the magnetic head unit 1 is moved in the direction of arrow E in FIG. 24 in the recording and/or reproducing apparatus 60 to write or read signal to or from a desired area on the flexible disc 7.

Figure 25:
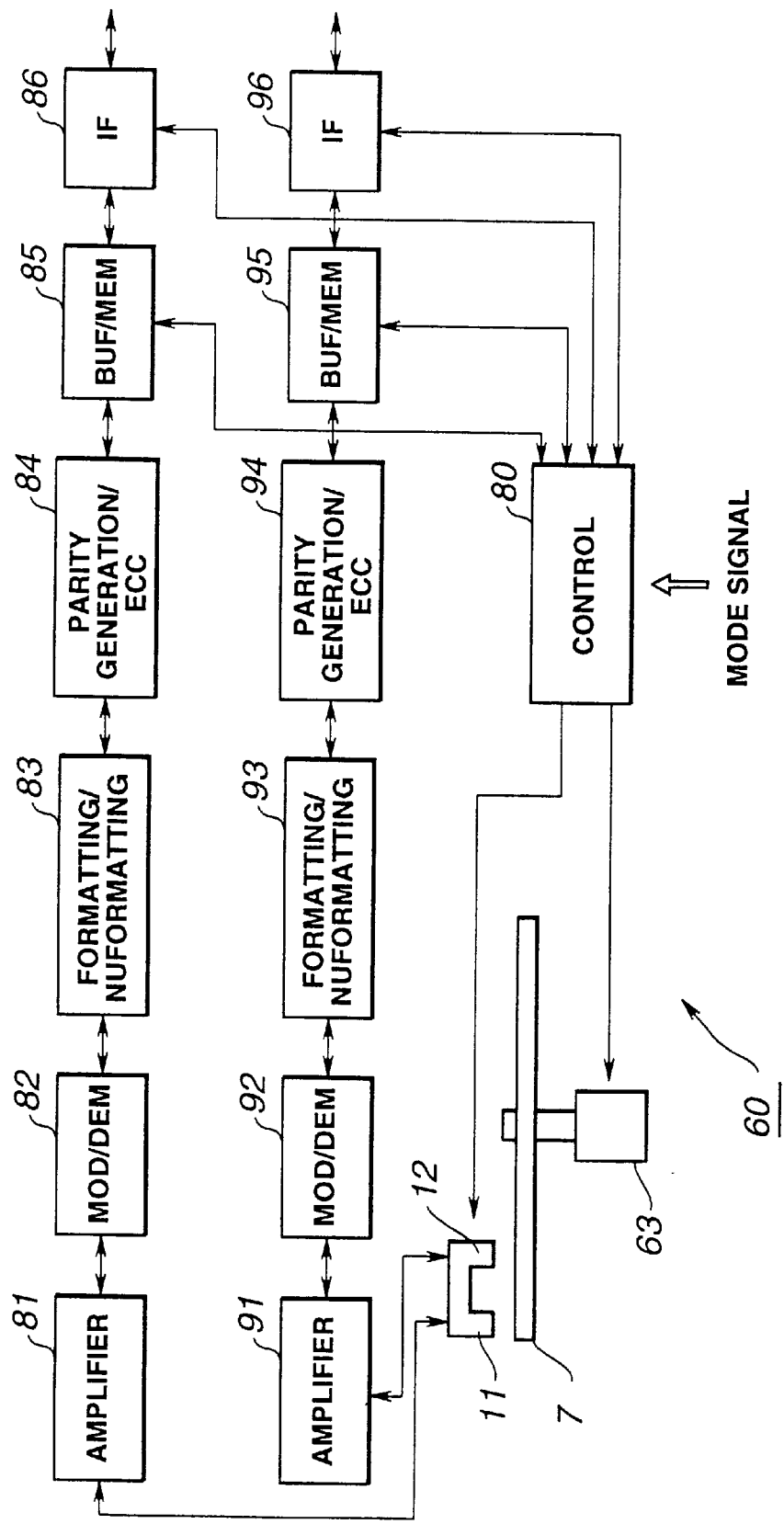
FIG. 25 is a schematic block diagram of a drive circuit for the recording and/or reproducing apparatus according to the present invention.

To drive the magnetic head unit 1 in the recording and/or reproducing apparatus 60, a circuit configured as shown in FIG. 25 is used.

The recording and/or reproducing apparatus 60 adopts the CAV (constant angular velocity) method to drive to spin the flexible disc 7 by the spindle motor 63 for writing or reading signal by the low density medium-oriented first magnetic head element 11 or high density medium-oriented second magnetic head element 12 of the magnetic head unit 1.

The first magnetic head element 11 of the magnetic head unit I has connected thereto an amplifier circuit 81, digital modulation/digital demodulation circuit 82 (which is referred to as "MOD/DEM" in FIG. 25), formatting/unformatting circuit 83, parity generation/error correction circuit 84 (which is referred to as "Parity GEN/ECC" in FIG. 25), buffer memory 85 (which is referred to as "BUFMEM" in FIG. 25), and an interface 86 (which is referred to as "IF" in FIG. 25). Similarly, the second magnetic head element 12 has connected thereto an amplifier circuit 91, digital modulation/digital demodulation circuit 92, formatting/unformatting circuit 93, parity generation/error correction circuit 94, buffer memory 95 and an interface 96.

The buffer memories 85 and 95 and interfaces 86 and 96 have connected thereto a control circuit 80 to control the operation of the disc drive. The control circuit 80 may be formed from a microcomputer, for example. The control circuit 80 is supplied from outside with a mode signal which designates either the high or low density medium-oriented mode. By way of example, the mode signal is generated by detecting whether a specification discrimination hole is in a predetermined position on the cartridge 6.

When the first flexible disc having a low recording density is set in the recording and/or reproducing apparatus 60, the mode signal will designate the low density medium-oriented mode. The control circuit 80 will respond to this mode signal to turn off the tracking servo and also enable the interface 86 while disabling the interface 96. For data write in this condition, a recording data from an external computer or the like is stored into the buffer memory 85. The recording data from the buffer memory 85 is supplied to the parity generation/error correction circuit 84 in which it is subjected to error correction coding to generate a parity.

The recording data and parity are supplied to the formatting/unformatting circuit 83 in which they are converted to a data in a predetermined format having a sector structure. The formatted data is supplied to the digital modulation/digital demodulation circuit 82 in which it is digitally modulated (for example, MFM). A data signal output resulted from the digital modulation is amplified bu the amplifier circuit 81 and supplied to the first magnetic head element 11 which will write it to the first flexible disc.

Following reversely the recording procedure, the data read by the first magnetic head element 11 from the first flexible disc is amplified by the amplifier circuit 81, and then digitally demodulated by the digital modulation/digital demodulation circuit 82. A data signal output resulted from the digital demodulation is unformatted by the formatting/unformatting circuit 83 and supplied to the parity generation/ECC circuit 84 in which it is subjected to error correction. Then, the error-corrected data is stored into the buffer memory 85. The data signal is saved into the external computer or the like via the interface 86.

Also, when the second flexible disc having a high recording density is set into the recording and/or reproducing apparatus 60, a similar data write or read to those in the above-mentioned low density medium-oriented mode is effected provided that the interface 86 is disabled while the interface 96 is enabled. For a higher tracking density, the tracking servo is turned on. Further, a different digital modulation from that in the low density medium-oriented mode. Moreover, for a higher track recording density, demodulation by Viterbi algorithm and zoned CAV are used as the case may be.

As having been described in the foregoing, the recording and/or reproducing apparatus 60 employs the magnetic head unit 1 in which the distance L between the surface of the gimbal plate 4 pressed by the pivot 52 and the surface of the magnetic head 5 facing the flexible disc 7 is set to fall in a range of 0.3 to 0.8 mm, so that the magnetic head 5 has a sufficient thickness to form the coil winding concavity 14 in the intermediate portion of the magnetic head in the direction of the head thickness, the magnetic head 5 can be kept in a stable posture in relation to the flexible disc 7, thus assuring an improved write and read.

In the magnetic head unit according to the present invention, the distance between a surface of the gimbal plate touching the pressing member and a surface of the magnetic head facing the first or second disc-shaped recording medium is set to fall in a range of 0.3 to 0.8 mm and thus the coil winding concavity can be formed in the intermediate portion of the magnetic head in the direction of the head thickness and the magnetic heads can be kept stably in place in relation to the first or second disc-shaped recording medium, thus permitting an improved recording and/or reproduction.

In the recording and/or reproducing apparatus according to the present invention, since the magnetic head unit in which the distance between a surface of the gimbal plate touching the pressing member and a surface of the magnetic head facing the first or second disc-shaped recording medium is set to fall in a range of 0.3 to 0.8 mm, the coil winding concavity can be formed in the intermediate portion of the magnetic head in the direction of the head thickness and the magnetic heads can be kept stably in place in relation to the first or second discshaped recording medium, thus permitting an improved recording and/or reproduction.

What is claimed is:

1. A magnetic head unit, comprising:
   a pair of magnetic heads each having a first magnetic head element to write and/or read signal to and/or from a first disc-shaped recording medium and a second magnetic head element to write and/or write signal to and/or from a second disc-shaped recording medium having a higher recording density than the first disc-shaped recording medium, the magnetic head having formed a concavity in an intermediate portion thereof in the direction of the head thickness said concavity open at a lateral side of the magnetic head and in which a coil is wound on the second magnetic head element;
   a pair of gimbal plates each supporting the magnetic head to be movable; and
   a pair of pressing members each abutting a gimbal plate to move the magnetic head towards the first or second disc-shaped recording medium;
   the distance between a surface of the gimbal plate touching the pressing member and a surface of the magnetic head facing the first or second disc-shaped recording medium being 0.3 to 0.8 mm.

2. A recording and/or reproducing apparatus, comprising:
   means for driving to spin a disc-shaped recording medium;
   a magnetic head unit to write and/or read a signal with respect to the disc-shaped recording medium drive to spin by said driving means; and
   a signal processor to supply the magnetic head unit with a signal corresponding to a recording signal and generate a read signal based on the signal supplied from the magnetic head unit;

the magnetic head unit comprising:

a pair of magnetic heads each having a first magnetic head element to write and/or read signal to and/or from a first disc-shaped recording medium and a second magnetic head element to write and/or write signal to and/or from a second disc-shaped recording medium having a higher recording density than the first disc-shaped recording medium, the magnetic head having formed a concavity in an intermediate portion thereof in the direction of the head thickness said concavity open at a lateral side of the magnetic head and in which a coil is wound on the second magnetic head element;

a pair of gimbal plates each supporting the magnetic head to be movable; and a pair of pressing members each abutting the gimbal plate to move the magnetic head towards the first or second disc-shaped recording medium;

the distance between a surface of the gimbal plate touching the pressing member and a surface of the magnetic head facing the first or second disc-shaped recording medium, being 0.3 to 0.8 mm.

* * * * *